Sept. 22, 1959   J. G. INGRES   2,905,152
POWER MECHANISM
Filed Feb. 15, 1955   2 Sheets-Sheet 1
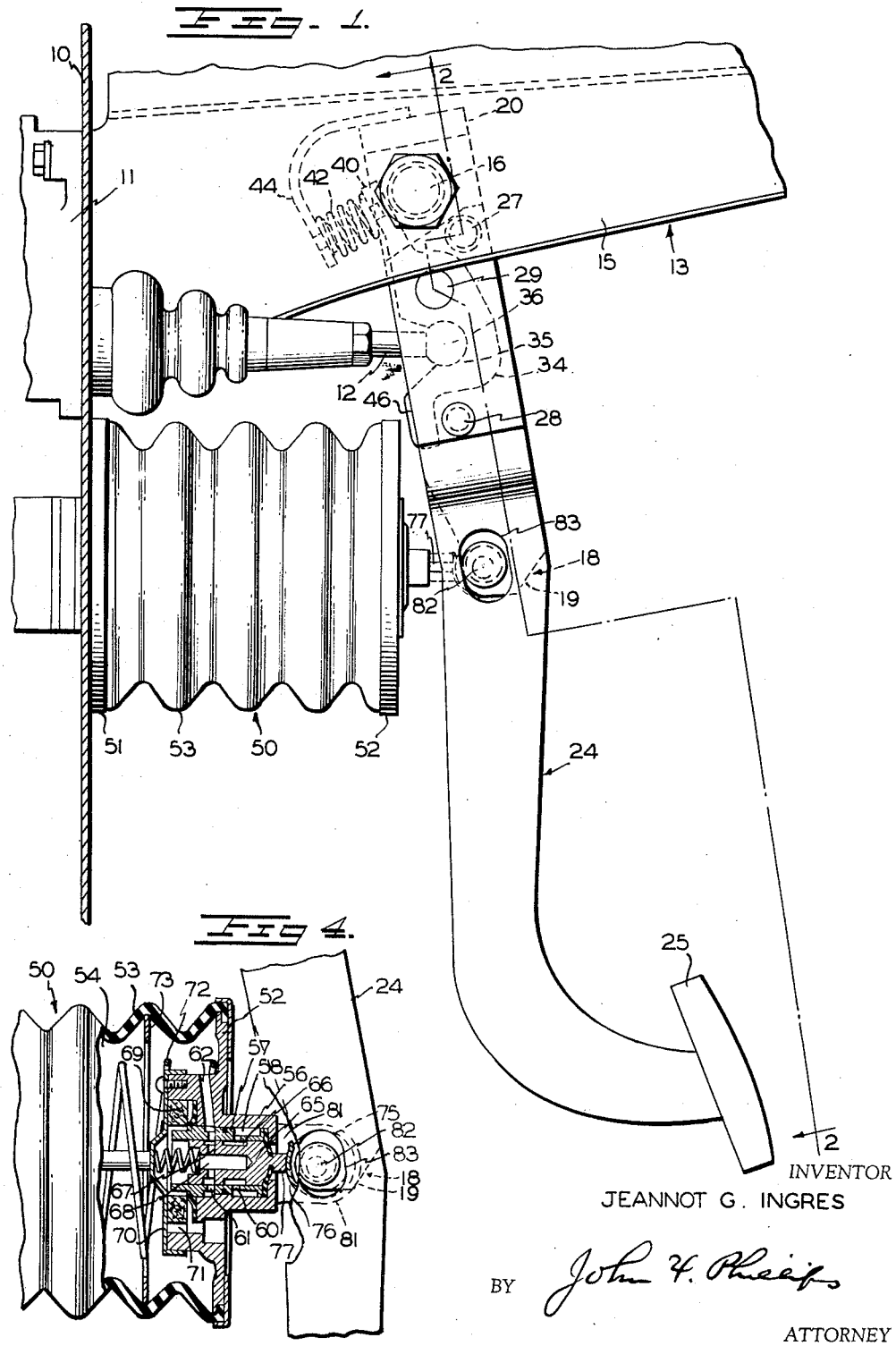
INVENTOR
JEANNOT G. INGRES
BY John F. Phillips
ATTORNEY

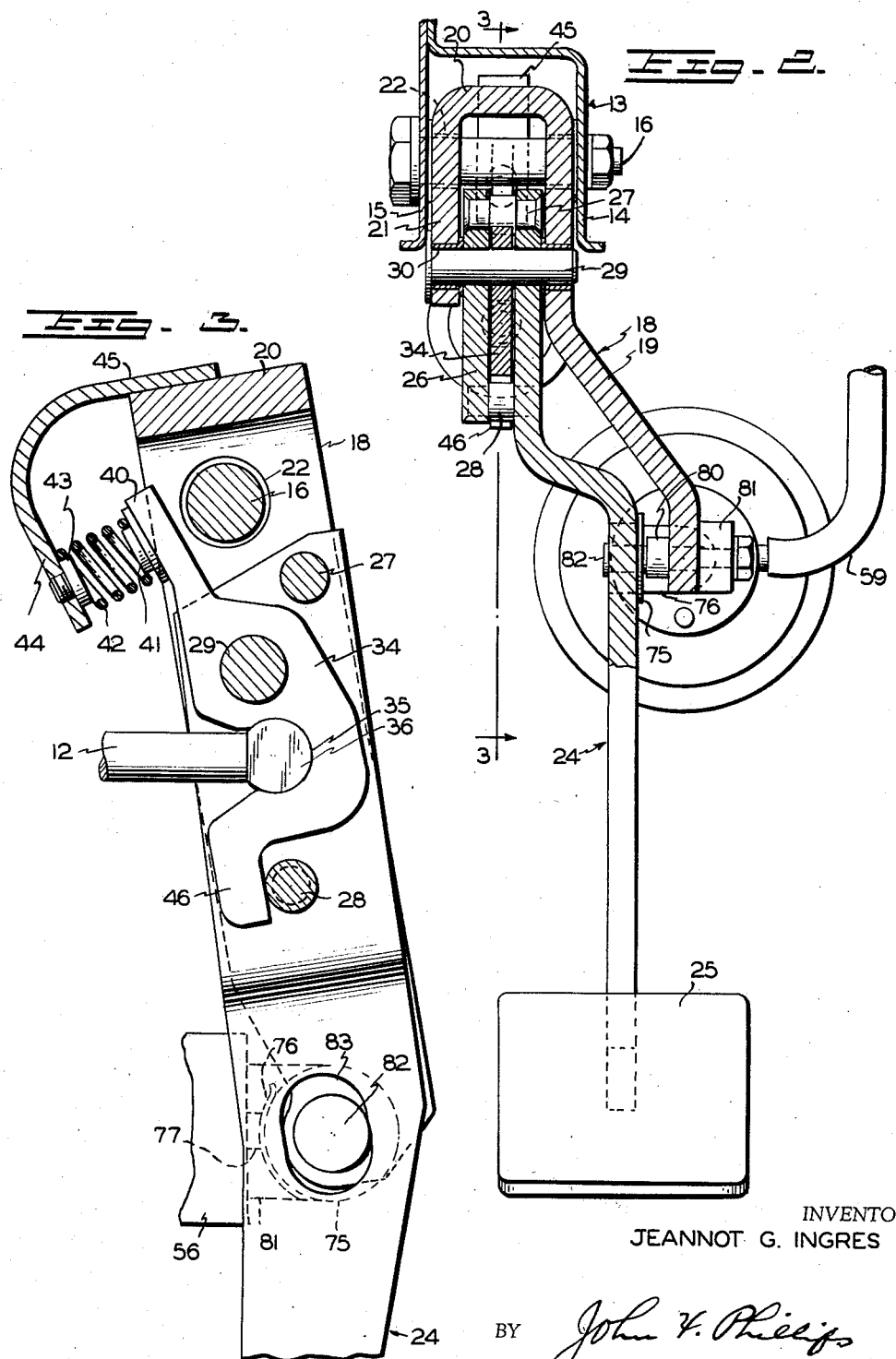

United States Patent Office

2,905,152
Patented Sept. 22, 1959

2,905,152
POWER MECHANISM

Jeannot G. Ingres, Dearborn, Mich., assignor to Kelsey-Hayes Company, a corporation of Delaware Application February 15, 1955, Serial No. 488,258

7 Claims. (Cl. 121—41)

This invention relates to a power mechanism and more particularly to a booster brake mechanism and is an improvement over the structure shown in my copending application Serial No. 463,492, filed October 20, 1954.

It is now the fairly common practice to operate motor vehicle brakes through a depending brake pedal supported at its uper end by a bracket carried by the fire wall of the vehicle and provided at its lower end with a pedal pad.

In my copending application referred to I have disclosed and claimed a booster brake mechanism wherein a two-element lever is employed and is so constructed as to be capable of substitution for the depending pedals employed for foot operation of the brakes. In my copending application, a power lever operable by the booster motor, is mounted to turn on a fixed axis carried by the conventional supporting bracket, and the pedal lever is mounted to turn on a pivot pin carried by the power lever and arranged below its fixed axis. The operating rod for the master cylinder is pivoted to the pedal lever so that initial movement of the pedal lever by the foot not only energizes the booster motor but also effects initial movement of the master cylinder piston.

The arrangement of parts in my copending application, and more specifically the pivotal connection of the pedal lever to a pin carried by the power lever and arranged below the fixed pivot axis of the latter, so shortens the lever arm between the pivot of the brake lever and the connection of the latter to the master cylinder plunger that manual effort necessary to effect initial master cylinder operation is materially reduced, the lever ratio being such that it requires no more effort to initiate operation of the master cylinder than is true with conventional foot operated brakes. The structure of my copending application, therefore, is highly practicable, but it is desirable in view of the present trend in booster brake mechanisms to provide an even softer initial operation in the brake pedal.

An important object of the present invention is to provide a novel lever arrangement, including a brake lever having a pedal pad depressible to energize the booster motor, and to so construct the lever mechanism that initial movement of the pedal pad is called upon to perform no operation except initial energization of the motor against the light biasing springs employed for the valves of such motor, the operator being completely relieved of applying any force to the master cylinder piston.

A further object is to provide such a lever mechanism, in combination with a booster motor therefor, wherein the pedal lever and power lever associated therewith operate in conjunction with a novel device which relieves the foot pedal of any master cylinder reaction during initial energization of the motor, but wherein such device moves, upon the building up of predetermined master cylinder pressure, to become in effect a unit with the brake pedal to transmit hydraulic reactions from the master cylinder to the pedal pad.

A further object is to provide such a mechanism wherein the device which relieves the operator of initially transmitting force to the master cylinder is in the form of a rocker having lost motion connection with the pedal lever and connected to the master cylinder piston to transmit movement thereto, the lost motion connection between the rocker and the pedal lever being taken up against a biasing spring when master cylinder pressures reach a predetermined point, from which point on during brake application, the rocker turns as a unit with the brake lever to transmit hydraulic reactions thereto.

A further object is to provide such a mechanism wherein the rocker is pivotally supported by the same pivot pin which connects the pedal lever to the power lever, and to provide stop means limiting turning movement of the rocker relative to the pedal lever in the direction opposite the turning movement of the pedal lever when the brakes are being applied, whereby the pedal lever picks up the rocker after the predetermined pressure referred to has been built up in the master cylinder, the pedal lever and rocker thereafter turning as a unit.

Other objects and advantages of the invention will become apparent during the course of the following description.

In the drawings I have shown one embodiment of the invention. In this showing:

Figure 1 is a side elevation of the apparatus and associated elements, parts being broken away and the fire wall being shown in section;

Figure 2 is a section on line 2—2 of Figure 1;

Figure 3 is a section taken generally on line 3—3 of Figure 2; and

Figure 4 is a detail view of a portion of the booster motor and its connection with the lever mechanism, portions of the booster motor being shown in section.

Referring to Figure 1, the numeral 10 designates a fire wall of a motor vehicle provided forwardly thereof with a conventional master cylinder 11 having therein the usual piston (not shown) movable by an operating rod 12. The fire wall is provided with a rearwardly extending rigidly supported bracket 13, as shown in my copending application referred to above.

Referring to Figure 2, it will be noted that the bracket 13 is of inverted channel shape and comprises opposite walls 14 and 15 between which extends a pivot bolt 16. This pivot bolt supports a power lever indicated as a whole by the numeral 18 and of a generally inverted J shape, comprising a relatively long depending arm 19, a transverse portion 20 at the top thereof and a depending arm 21. The pivot bolt 16 extends through the upper portions of the arms 19 and 21, and these arms preferably are provided with bearing sleeves 22.

A pedal lever indicated as a whole by the numeral 24 has its upper end arranged between the arms 19 and 21 and relatively close to the arm 19 as shown in Figure 2. A pedal pad 25 is mounted on the lower end of the pedal lever 24. A plate 26 is arranged parallel to and spaced from the upper end of the pedal lever 24 and is fixed thereto by upper and lower spacer rivets 27 and 28. The pedal lever and plate 26 are mounted on a pivot pin 29 carried by the power lever and extending through the upper end of the arm 19 and through the arm 21. Such arms are preferably provided with bearing bushings 30 supporting the pin 29.

In the space between the upper end of the pedal lever 24 and the plate 26 is arranged a rocker 34 mounted on the pivot pin 29, this pin therefore serving as a common pivotal support for the pedal lever 24 and the rocker 34. Below the pivot pin 29, the rocker 34 is provided with a recess 35 preferably having a cylindrical surface and receiving the similarly shaped outer surface of a head 36 carried by the push rod 12. The head 36 is inserted in the recess 35 transversely thereof before assembling the rocker 34 and head 36 relatively to the pedal lever 24 and plate 26. Thereafter, the riveting of the members 27 and 28 locks the head 36 in the recess 35.

At its upper end, the rocker 34 is provided with an upwardly extending finger 40 carrying a spring seat 41 engaging one end of a compression spring 42. The other end of this spring surrounds a spring seat 43 carried by the lower end of an arm 44 spaced substantially from and parallel to the finger 40. The upper end of the arm 44 has its extremity 45 projecting across and spot-welded or otherwise secured to the cross arm 20 of the power lever. In the normal position of the parts in Figure 1, the finger 40 engages the pivot bolt 16 to limit the clockwise turning movement of the rocker 34 about the pivot pin 29. The lower end of the rocker 34 is provided with a depending finger 46 normally spaced from the rivet 28 and movable into engagement therewith during operation of the brake as shown in Figure 3. The rivet 28 therefore serves as a stop pin to limit turning movement of the rocker 34 in a counterclockwise direction about the pivot pin 29 relative to the pedal lever 24.

A motor adapted for use as the power source is shown in Figure 4. The motor per se forms no part of the present invention and may be of the type shown, for example, in my copending application referred to. It will become apparent, however, that the motor is important in the operation of the general combination. Referring to Figures 1 and 4, the numeral 50 designates the motor as a whole which comprises a stationary head 51 preferably fixed to the fire wall 10 and a movable wall 52. These walls are connected by a bellows 53, forming with the motor heads a variable pressure chamber 54 normally open to the atmosphere, as will become apparent. The head 52 carries, preferably integral therewith, a valve housing 56 having therein a valve sleeve 57. The housing and sleeve cooperate to form a vacuum chamber 58 communicating through a duct 59 (Figure 2) with a source of vacuum such as the intake manifold of the vehicle engine. The sleeve 58 has vacuum ports 60 therethrough communicating with the chamber 58, and is further provided with ports 61 communicating through a passage 62 with the motor chamber 54.

A valve 65 is slidable in the sleeve 57 and is provided with an annular groove 66 normally communicating with the ports 61 and movable to connect such ports with the ports 61 during operation of the motor. The valve 65 is provided with air ports 67 normally communicating with the ports 61 and in constant communication at their inner ends with an axial passage 68 in the valve body to which air is admitted through an air cleaner 69 fixed to the inner end of the valve housing 56 by a plate 70. Air is supplied to the air cleaner through an atmospheric port 71. The motor is provided with the usual return spring 72 having one end surrounding the enlarged inner end of the valve body 56 and its opposite end engaging the stationary motor head 51, as will be apparent. The bellows 53, as in my copending application referred to, is preferably provided with subtending rings 73 to prevent the radial collapsing of the bellows when vacuum is present therein.

A plate 75 is carried by the pedal lever 24 and is provided with a lateral extension 76, preferably arcuate as shown in Figure 4. The arcuate extension 76 engages a button 77 carried by the valve 65 and projecting from the rear end of the valve housing 56. It will be apparent that initial movement of the brake pedal will move the valve 65 to energize the motor 50.

The lower end of the power lever 18 carries a pin 80 projecting through an ear 81 preferably formed integral with the valve housing 56 and projecting rearwardly therefrom. The pin 80 and ear 81 form the mechanical connection between the power lever 18 and the movable motor head 52. The pin 80, at the side of the lever 18 opposite the ear 81, carries a projection 82 mounted in a slot 83 formed in the pedal lever 24 and in the plate 75. The pin 82 normally engages the left-hand side of the slot 83 as shown in Figure 1 and is normally spaced from the right-hand side of such slot, and accordingly it will be apparent that the pedal lever 24 is movable from the normal off position an appreciable distance independently of the power lever 18.

*Operation*

The parts occupy the normal positions shown in Figure 1. The pin 82 (Figure 4) will be in engagement with the left-hand side of the slot 83. The arm 40 of the rocker will be in engagement with the pin 16 and the lower finger 46 of the rocker will be spaced to the left of the rivet 28 as shown in Figure 1. When the brake is to be operated, the operator will depress the pedal 25. The pedal lever moves to the left as viewed in Figure 1, turning in a clockwise direction about the pivot pin 29 while the power lever 18 remains stationary. The rivet 28, carried by the pedal lever, will rock therewith, but this rivet has substantial lost motion relative to the finger 46 and accordingly the rocker 34 will remain stationary. The only function performed by the pedal lever in such initial movement, therefore, will be to operate the button 77 (Figure 4) and move the valve 65 to energize the motor. The ports 67 will be moved out of communication with the passage 62, and the valve groove 66 will bridge across the ports 60 and 61. The motor chamber 64 thus will be cut off from communication with the atmosphere and will be connected to the vacuum chamber 58. Air will be exhausted from the motor chamber 54 and the motor head 52 (Figure 4) will start to move toward the left. This movement will be transmitted through ear 81 to the pin 80 to move the power lever 18. This lever will then start to swing in a clockwise direction about its pivot 16, and such movement effects movement to the left in Figure 1 of the pivot pin 29.

Before play is taken up between the rivet 28 and finger 46 the motor will be energized to swing the power lever 18 and move the pivot pin 29 toward the left, carrying with it the rocker 34. The spring 42 has a predetermined loading and preferably is initially compressible when a line pressure of from 50 to 80 lbs. occurs in the master cylinder. Power operation of the lever 18, therefore, effects initial movement of the push rod 12 to displace fluid from the master cylinder without any assistance from the pedal lever 24.

When the master cylinder pressure reaches the predetermined pressure for which the spring 42 is designed, reaction through the push rod 12 will be transmitted to the rocker 34 through the head 36 to turn the rocker 34 counterclockwise about the pivot pin 29. Such action compresses the spring 42 and moves the finger 46 into engagement with the rivet 28. This rivet serves as a stop to limit turning movement of the rocker 34 in the direction stated, and throughout the remainder of the pedal operation, the finger 46 will remain in engagement with the rivet 28, and the rocker 34 and pedal lever 24 then become a unit. Pedal forces applied to the lever 24 will be transmitted through the rivet 28 to the rocker 34 to be applied through push rod 12 to the master cylinder. Power forces will be transmitted through the pivot pin 29, turning about the axis of the pin 16, to transmit force to the unit comprising the lever 24 and rocket 34. Throughout the remainder of the operation, therefore, part of the braking force will be applied to the master cylinder by foot pressure on the pedal pad 25 and the remainder of the power will be supplied by the motor. Obviously, the operator will feel through the pedal pad 25 a proportionate reaction in accordance with pressures in the master cylinder.

The point of power "run-out" or maximum motor energization will occur prior to the maximum brake application. As the power "run-out" point is approached, the pedal lever 24 will swing to the left relative to the power lever 18 and approximately at the point of maximum motor energization the right-hand side of the slot 83 (Figure 4) will engage the pin projection 82. From this point to the point of maximum brake application, the pedal lever 24 and power lever 18 will turn as a unit about the axis of the pivot pin 16.

The operation occurring upon the releasing of the pedal will be obvious. When the pedal is released, the valve 65 will return to its normal position disconnecting the motor chamber 54 from the source of vacuum and connecting it to the atmosphere, whereupon the motor return spring 72 will swing the power lever 18 back to its normal position, the pedal lever 24 being returned to such position by the usual master cylinder return spring.

From the foregoing it will be apparent that the present invention provides a novel, relatively simple lever mechanism of such nature that initial operation of the brake pedal takes place solely against the action of the valve return spring. The operator is not called upon to transmit any thrust to the push rod 12 in the initial operation of the mechanism, and accordingly the apparatus provides the highly desirable "soft" initial pedal.

It also will be apparent that the spring 42 may be designed to be overcome at any desired line pressure in the master cylinder, and it is not until such line pressure is reached that the finger 46 will engage the rivet 28, serving as a stop, to thereafter transmit pedal pressures to the master cylinder and to subject the pedal pad to hydraulic reactions proportionate to the pressures generated in the master cylinder. The parts, as stated, occupy the normal positions shown in Figure 1 and, as will be clear from Figure 3, the engagement of the finger 46 with the rivet 28 will occur as soon as line pressures have been built up in accordance with the predetermined loading of the spring 42. As stated, from such point on throughout the remainder of the brake application, the finger 46 will remain in engagement with the rivet 28 and the pedal lever 24 and rocker 34 will turn as a unit about the axis of the pin 29. As further distinguished from the copending application referred to, the single pin 80 serves the dual purpose of connecting the movable motor head to the power lever 18 and of providing with the slot 83 the means for effecting a lost motion connection between the levers 18 and 24 to provide for the operation described above.

It is to be understood that the form of the invention shown and described is to be taken as a preferred example of the same and that various changes in the shape, size and arrangement of the parts may be made without departing from the spirit of the invention or the scope of the appended claims.

I claim:

1. A power mechanism comprising an operable member, a pedal lever and a power lever both pivotally supported to one side of said operable member for turning movement, a motor connected to said power lever and having a control mechanism for controlling its energization and comprising an element arranged in the path of travel of a portion of said pedal lever to be actuated thereby to energize said motor upon movement of said pedal lever from a normal off position, a motion transmitting member engageable with and mounted for movement relative to both of said levers and engaging said operable member, said motion transmitting member being supported at said side of said operable member and having a portion at the opposite side of said operable member provided with lost motion connection with said pedal lever when said pedal lever is in normal off position whereby initial movement of said pedal lever from its normal off position takes place independently of said motion transmitting member to energize said motor before said lost motion connection is taken up to transmit movement from said pedal lever to said motion transmitting member, and means biasing said motion transmitting member to a normal position.

2. A power mechanism comprising an operable member, a pedal lever and a power lever both pivotally supported to one side of said operable member for turning movement, a motor connected to said power lever and having a mechanism for controlling its energization and comprising an element projecting from the motor into engagement with a portion of said pedal lever, a motion transmitting member pivotally connected to and bodily movable with said pedal lever and connected to said operable member, said motion transmitting member having a portion at the opposite side of said operable member spaced from a portion of said pedal lever when the latter and said motion transmitting member are in normal positions, means limiting turning movement of said motion transmitting member relative to said power lever when said motion transmitting member is in its normal position, and spring means interposed between said power lever and said motion transmitting member for biasing the latter to its normal position.

3. A power mechanism comprising an operable member, a power lever, means supporting said power lever for turning movement on a fixed axis offset from said operable member, a pedal lever pivotally connected to said power lever at a point between said fixed pivot and said operable member, a motor connected to said power lever and having a control mechanism including an element normally engaging a portion of said pedal lever and operable thereby when said pedal lever moves from a normal off position, power transmitting means carried by said pedal lever and having mechanical engagement with said operable member and said power lever, said power transmitting means having a normal position in which it has lost motion connection with said pedal lever to be operative only after a predetermined movement of said pedal lever from its normal off position for transmitting forces from said levers to said operable member, and a spring biasing said power transmitting means to said normal position.

4. A power mechanism comprising an operable member, a power lever, means supporting said power lever for turning movement on a fixed axis at a point offset from said operable member, a pivot pin carried by said power lever between said fixed axis and said operable member, a pedal lever pivoted on said pivot pin and having a normal off position, a motor connected to said power lever and having a control mechanism including an element normally engaging a portion of said pedal lever and operable thereby when said pedal lever moves from its normal off position, a power transmitting member pivoted on said pivot pin and connected to said operable member, said power transmitting member having a normal off position and having a portion offset from said operable member opposite said pivot pin spaced from a portion of said pedal lever to provide a lost motion connection therewith when said power transmitting member is in a normal position, and means biasing said power transmitting member to said normal position.

5. A power mechanism comprising an operable member, a power lever supported for turning movement on a fixed axis above said operable member and depending from said fixed axis, a pivot pin carried by said power lever between said fixed axis and said operable member, a pedal lever mounted to turn on said pivot pin and depending therefrom, a motor connected to said power lever and having a control mechanism including an operating element engaging a portion of said pedal lever to be moved thereby to energize said motor when said pedal lever moves from a normal off position, a rocker pivoted on said pivot pin and having a normal position, said rocker being connected to said operable member, said rocker beneath said operable member having a portion spaced from a portion of said pedal lever to provide a lost motion connection when said rocker and said pedal lever are in their normal positions, means for limiting turning movement of said rocker about said pivot pin to its normal position, and a spring interposed between said power lever and said rocker to bias the latter to its normal position, said levers, when said pedal lever is in its normal position, having lost motion connection with each other.

6. A power mechanism comprising an operable member, a power lever pivoted for turning movement on a fixed axis above said operable member, said power lever extending downwardly below said operable member, a pivot pin carried by said power lever between said fixed axis and said operable member, a pedal lever comprising a pedal arm and a plate fixed thereto and spaced therefrom and supported for turning movement on said pivot pin, a motor connected to the lower end of said power lever and having a control mechanism including an operating element engaging said pedal lever to be operated thereby when said pedal lever moves from a normal off position, a rocker arranged between said pedal arm and said plate and pivotally supported by said pivot pin, said rocker being connected to said operable member and provided at its lower end with a depending finger, said pedal lever having a stop member spaced from said finger when said rocker is in a normal position, said rocker being limited in its turning movement about said pivot pin to its normal position and having an upwardly extending finger at its upper end, and a biasing spring interposed between said upwardly extending finger and said power lever to bias said rocker to its normal off position.

7. Apparatus according to claim 6 wherein said motor is connected to said power lever through the medium of a connecting pin, said pedal lever having a slot receiving said pin and being wider than said pin to provide a lost motion connection between said levers.

References Cited in the file of this patent
UNITED STATES PATENTS

| | | |
|---|---|---|
| 2,181,757 | Fitzgerald | Nov. 28, 1939 |
| 2,207,700 | Porter | July 16, 1940 |
| 2,208,282 | Shelor | July 16, 1940 |
| 2,259,832 | Rudolph | Oct. 21, 1941 |
| 2,265,546 | Price | Dec. 9, 1941 |
| 2,445,862 | Price | July 27, 1948 |

FOREIGN PATENTS

| | | |
|---|---|---|
| 307,831 | Great Britain | June 5, 1930 |